(12) United States Patent
Mitchell et al.

(10) Patent No.: US 9,294,434 B1
(45) Date of Patent: Mar. 22, 2016

(54) CONNECTIONLESS COMMUNICATIONS

(71) Applicants: Gary Mitchell, Woodbine, MD (US); Scott Whittle, Olney, MD (US); Kurt Quasebarth, Baltimore, MD (US)

(72) Inventors: Gary Mitchell, Woodbine, MD (US); Scott Whittle, Olney, MD (US); Kurt Quasebarth, Baltimore, MD (US)

(73) Assignee: IP Technology Labs, LLC, Olney, MD (US)

( * ) Notice: Subject to any disclaimer, the term of this patent is extended or adjusted under 35 U.S.C. 154(b) by 209 days.

(21) Appl. No.: 13/789,590

(22) Filed: Mar. 7, 2013

Related U.S. Application Data

(60) Provisional application No. 61/724,752, filed on Nov. 9, 2012.

(51) Int. Cl.
*G06F 17/30* (2006.01)
*H04L 29/12* (2006.01)

(52) U.S. Cl.
CPC ...... *H04L 61/1547* (2013.01); *G06F 17/30893* (2013.01)

(58) Field of Classification Search
CPC ................................ G06F 21/00; G06F 21/305
USPC ........................................................ 707/782
See application file for complete search history.

(56) References Cited

U.S. PATENT DOCUMENTS

| | | | | |
|---|---|---|---|---|
| 7,327,701 B2* | 2/2008 | Fong | | 370/328 |
| 8,495,181 B2* | 7/2013 | Venkatraman et al. | | 709/220 |
| 8,621,213 B2* | 12/2013 | Logan et al. | | 713/168 |
| 8,745,223 B2* | 6/2014 | Hodul | | 709/225 |
| 2005/0059379 A1* | 3/2005 | Sovio et al. | | 455/411 |
| 2007/0088825 A1* | 4/2007 | Hodul | | 709/225 |
| 2008/0095128 A1* | 4/2008 | Fong | | 370/338 |
| 2013/0244579 A1* | 9/2013 | Hohteri et al. | | 455/41.2 |
| 2014/0108804 A1* | 4/2014 | Kanungo et al. | | 713/170 |

* cited by examiner

*Primary Examiner* — Debbie Le
(74) *Attorney, Agent, or Firm* — Offit Kurman; Kristin Mazany Nevins

(57) ABSTRACT

Described are techniques for facilitating automated connections between any two devices a plurality of devices—including applications—across disparate and unsecured networks including the Internet. For example, details about a device or application including its unique identity are managed through a master repository in a protocol-agnostic manner. By requiring hosts in a network to maintain communication (bi-directionally) with the repository, the repository acts as an intelligent-management bridge between different devices and sources.

4 Claims, 4 Drawing Sheets

FIG. 3

CONNECTIONLESS COMMUNICATIONS

CROSS-REFERENCE TO RELATED APPLICATIONS

This application claims the benefit of U.S. Provisional Patent Application No. 61/724,752, entitled "Connectionless Communications" filed on Nov. 9, 2012, the contents of which are herein incorporated by reference.

BACKGROUND

When devices and applications attempt to communicate between each other securely, they usually must do so across unsecured and untrusted networks often while mobile. Because protocols used to communicate between devices have not kept pace with security and mobility management, a myriad of security and mobility systems, protocols, and devices have been invented that are often incompatible with each other. This has made establishing secure connections between devices difficult to implement—even for experts in the field. So the process of creating secure connections across the Internet is often difficult, inefficient, and expensive.

SUMMARY

Described are techniques for facilitating automated connections between any two devices—including applications—across disparate and unsecured networks including the Internet. For example, details about a device or source including its unique identity are managed through a master repository (i.e., database) in a protocol-agnostic manner. By requiring hosts in a network to maintain communication (bi-directionally) with the repository, the repository acts as an intelligent-management bridge between different devices, applications, and sources.

This summary is provided to introduce a select concept in a simplified form that is further described below. This summary is not necessarily intended to identify key features or essential features of the claimed subject matter, nor is it necessarily intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 shows a screen shot rendered on a user interface of computer and includes a unique ID, and status parameters about an example device or application.

DETAILED DESCRIPTION

Illustrative Environment

Figure 1:
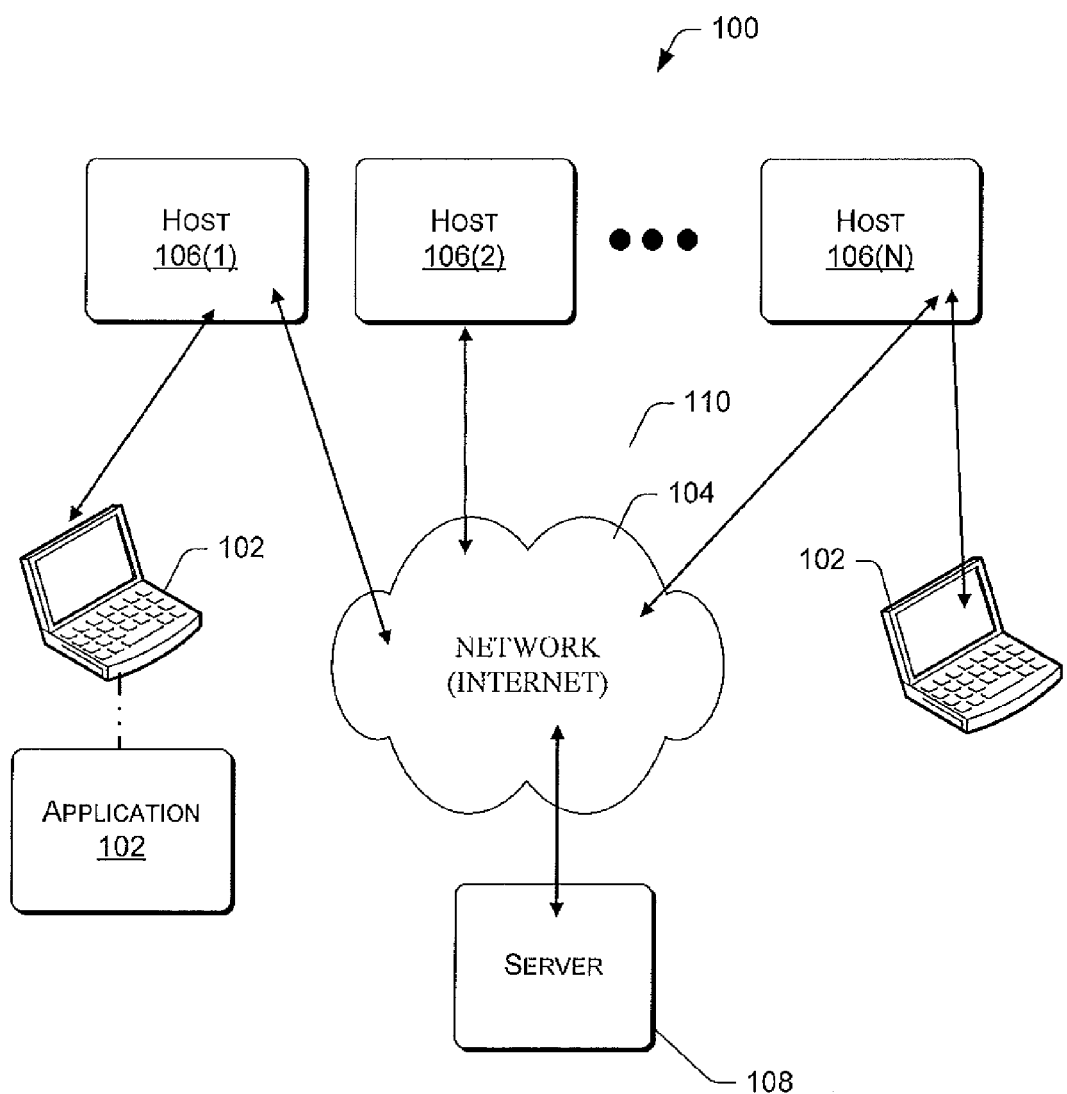
FIG. 1 depicts an illustrative environment in which the unique identity and parameters about one or more device(s) or source(s) are managed, thereby facilitating automatic and secure peer-to-peer communications.

FIG. 1 depicts an illustrative environment 100 in which the unique identity and parameters about one or more device(s) or source(s) 102 are managed, thereby facilitating automatic and secure peer-to-peer communications between different devices 102 across network(s) 104 including portions of the Internet. As used in this description, a device may take a variety of forms including, but not limited to, a computing device, mobile phones such as smart phones, tablet, desktop, and laptop computers, media devices, or any application or source operating on a processor such as mobile-phone application or various other application(s) as would be appreciated by those skilled in the art.

Network(s) 104 represent any type of communication network(s), including wire-based (i.e., fiber optic, cable, etc.), wireless (i.e. cellular, WiFi, Bluetooth, etc.), or combinations thereof.

Hosts 106(1), 106(2), . . . , 106(N) represent any type of client or server computing device on network 104. Each host may be configured to send and receive data. For instance, in one example, hosts 106 serve as network or IP hosts that may offer any suitable information resources, services, and applications to users or other nodes on a network. As appreciated by those skilled in the art after having the benefit of this disclosure, a host may be a dedicated server or router through which incoming or outgoing messages are routed on behalf of a client device, user, or application and use any suitable addressing protocol or layer.

Server 108 generally represents a name server that hosts a network service such as providing responses to queries against a directory service. In other words, server 108 may map human-readable addresses to numeric identification or addressing components such as Internet Protocol (IP) addresses, according to one or more network-service protocols. For instance, server 108 may represent a Domain Name System (DNS) server to identify and locate computer systems and resources on the Internet.

Figure 2:
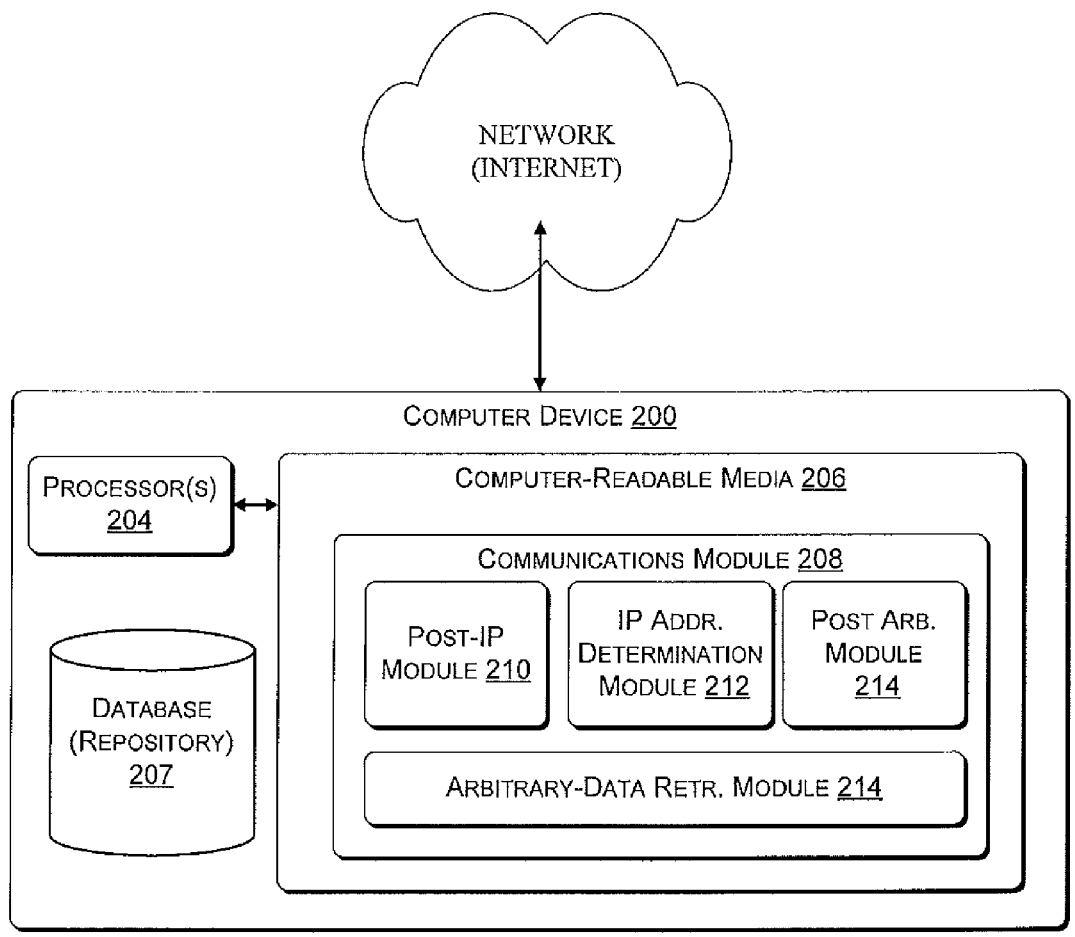
FIG. 2 is a block diagram illustrating an example computing device.

Hosts 106 and server 108 also represent any suitable computing device. FIG. 2 is a block diagram illustrating such as example device 200. In this illustrative example, device 200 includes one or more processor(s) 204 and the ability to access a computer-readable media 206. Processor(s) 204 interact with computer-readable media 206 to execute instructions that facilitate functionality of each router or server.

Processor(s) 204 may be distributed in more than one computer system and over a network. Examples of computer device 200 may include, but are not limited to, a server, a personal computer, special computer, distributed-computer systems, or other computing devices having access to processor(s) and computer-readable media. Further, although not shown, any number of system busses, communication and peripheral interfaces, input/output devices, and other devices may be included in computer system 200, as is appreciated by those skilled in the art.

Computer-readable media 206 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory or non-transmission medium that can be used to store information for access by a computing device.

In other examples, the computer-readable media 206 may include communication media that may embody computer readable instructions, data structures, program modules, or other data in a modulated data signal, such as a carrier wave, or other transmission mechanism. As used in this detailed description, computer-storage media does not include communication media.

Further, computer-readable media 206 may be local and/or offsite to computer device 200. For instance, one or more portions of, or all of data or code stored in computer-readable media 206, may be accessed from a computer-storage medium local to and/or remote to computer system 200, such as from a storage medium connected to a network.

Resident in computer-readable media 206 may be one or more operating systems (not shown), and any number of other program applications or modules in the form of computer-executable instructions and/or logic which are executed on processor(s) 204 to enable processing of data or other functionality. Also resident in computer-readable media 206 is one or more databases.

For example, in one implementation database 207 includes parameters providing a status of each device at a particular time and may include unique identifiers associated with a device as will be explained in more detail.

Example

Communications Module

Computer device 200 (whether implemented as a server 108 or host 106) is configured with a communications module 208 maintained in computer-readable media 206. In one example, communications module 208 may be implemented as code in the form of computer-readable instructions that execute on one or more processors 204. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in computer-readable media 206 may be implemented across hosts 106, and server 108, or one or more other hosts or servers in a cloud computing environment or on a cooperative combination of both. Thus, the following discussion does not limit the implementation of code stored in computer-readable media 206 to any particular device or environment.

Communications module 208 may include components contained in computer-readable media 206. In one example, communications module 208 includes: a post-IP-address module 210, an IP-address-determination module 212, a post-arbitrary-data module 214, and an arbitrary-data retrieval module 216.

Example post-IP-address module 210 facilities a mode of operation in which a host (or other device/application) sends a message containing an Internet address using a unique identifier (ID) exclusively associated with the host or other device/application). The unique ID may be any number assigned to and associated to a device. For example, the unique ID may be an Ethernet MAC address such as 00-08-48-72-fd-c7. This unique ID may be coupled with other data location information with an "A" record showing the public IP address of 95.200.2.34.

Aly*  [00-80-48-72-fd-c7]  [10]  [IN]  [A]  [94.200.2.34]

As appreciated by those skilled in the art after having the benefit of reviewing this disclosure, the unique ID is not limited to a MAC address format, and may be any predetermined string of alphanumeric characters or other codes or values associated with a device.

Post-IP-address module 210 module will create an update message to be sent to a user specified configured domain (ex. iptlabs.com) using a unique device identification (e.g. Ethernet MAC address.) Posting of the unique ID and other data may occur at power up of the host, at predetermined-periodic intervals, and/or upon polling, such as from a server 108.

An IP-address-determination module 212 uses the unique ID to query a database 207 to ascertain the IP-address associated with a host. Unique ID stored as in database to allow the database to find that device.

Post-arbitrary-data module 214 allows a device or host, from time-to-time post data to database 207. This data may be for the device's own use, use by another device host or server, or other devices not configured with communications module 208. The data format is arbitrary, as per the application, and is not required to be defined.

For example, an update message is created for arbitrary data to be sent to a user specified configured domain (ex. iptlabs.com) using a unique device identification (e.g. Ethernet MAC address.)

The update may contain a DNS "TXT" resource record for determined IP address.

Using the common and public domain DNS tool NSUPDATE, along with encryption, puts that update into the authoritative DNS server database for that domain.

Any generic-network device may obtain the data by querying the DNS fully qualified domain name (e.g. unique_id.iptlabs.com) with request for the TXT record.

[00-80-48-72-fd-c7]  [10]  [IN]  [TXT]  [00-80-48-72-fd-c7=+00,80,48,72,fdq7-nf1=+0d-8h-0n-48s=+64,100,2,34=+(92,168,0,144=)]

Multiple lines may be posted by post-arbitrary-data module 214 for placing larger amounts of arbitrary data.

An example arbitrary-data retrieval module 216 allows any application to query and retrieve a TXT record with arbitrary data using a unique identifier. This may include "global" identifiers which are read by all devices or a hierarchical structured identifier set to permit addressing a specific plurality of hosts; or specific unique identifiers to address a single host.

Using DNS system may require the use of the resource records so that the DNS system functions properly and that the required information is available at request time. Nonetheless, as appreciated by those skilled in the art after having the benefit of reviewing this disclosure, communications module 208 and portions thereof may operate on alternative transport methods, such as http, ftp, NTP, These would need to be investigated but could use Network Time Protocol (NTP), Simple Mail Transfer Protocol (SMTP), Internet Control Message Protocol (ICMP), Hypter Text Transfer Protocol (HTTP), etc. or custom protocols could possibly be employed to provide similar communications as DNS.

The example communication module 208 may not require any direct access to a final messaging server, although the examples may function with direct with direct access as well.

Thus, communication module 208 facilitates communications without the need for direct access or direct connection between the communicating devices:

1) No modification of Internet DNS system or servers for communications is required.

2) Communication is possible anywhere in the world and thus is not prone to filtering or blockages in which other device-to-device communications methods are often rendered inoperable.

3) Asynchronous non-real time communications is possible. These communications may not depend on an established communication path for messaging. Commonly known as store and forward the messaging is available when the device is becomes available.

4) Dynamic and unlimited forward and backward communications messaging structure which is independent of the DNS system transport, servers, or services.

5) Deployment of private closed-systems of any size for customers which require their own suitable system/solution for their applications is adaptable.

Figure 3:
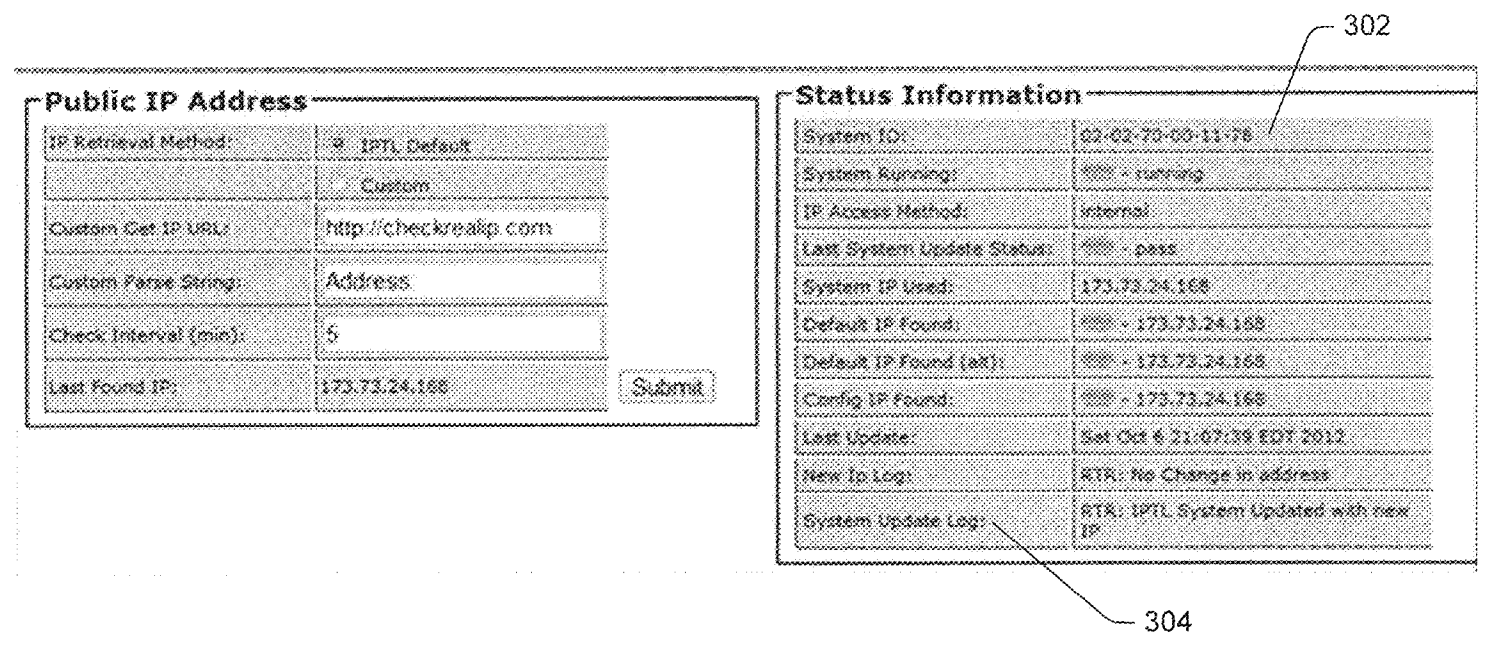

FIG. 3 shows a screen shot rendered on a user interface of computer and includes a unique ID 302, and status parameters 304 about an example device, which was retrieved from a record in database 207. Thus, database 207 acts as a messaging server allowing other devices or applications, to understand how a specific device or application (at an unknown location) is configured, its status (such as whether operating properly and connectivity), and how to connect automatically thereto.

Database 207 may contain a unique ID and other data parameters in agnostic fashion across different environments, networks, layers, applications, protocols, and domains.

Example

Illustrative Process

Figure 4:
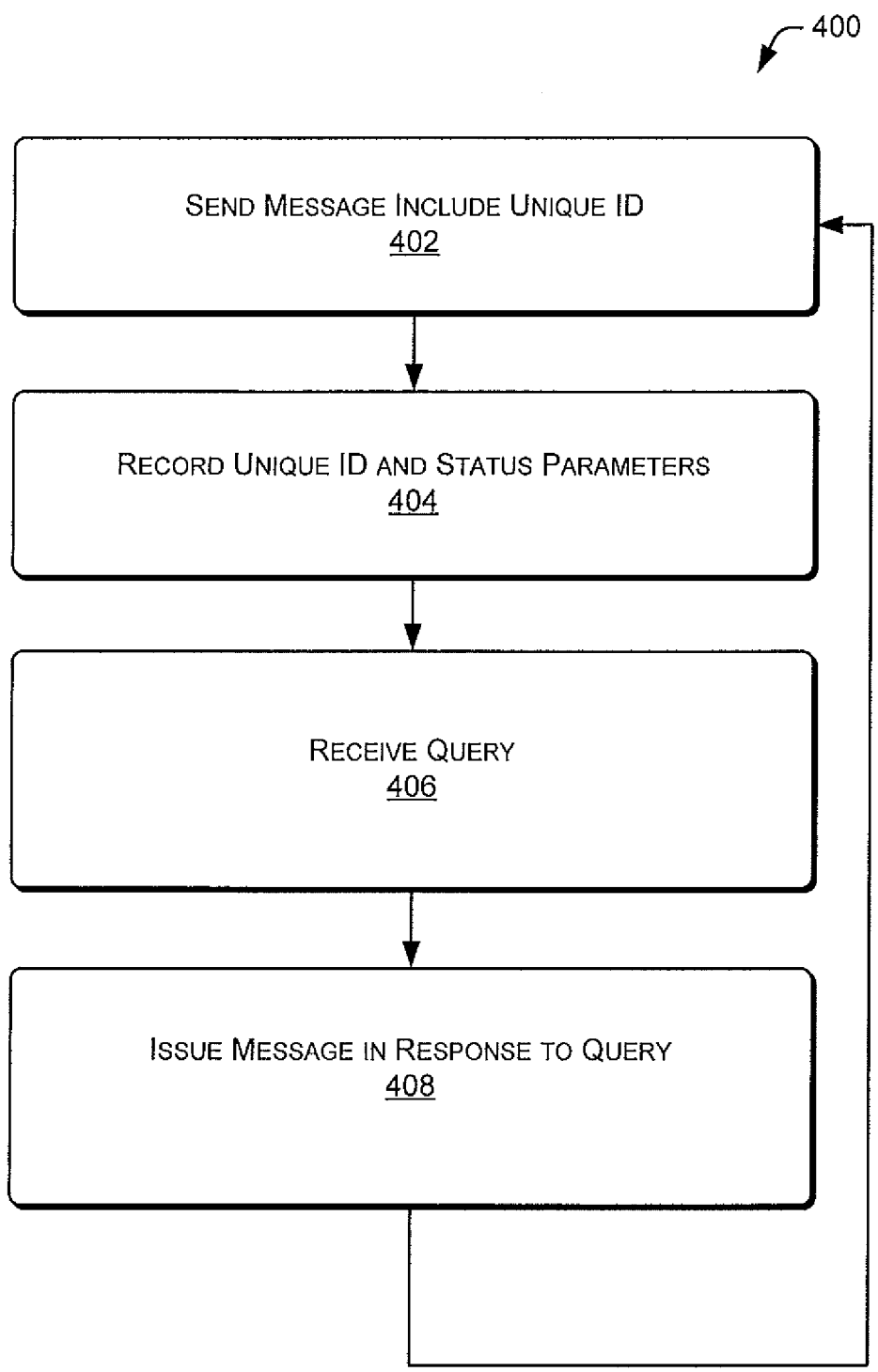
FIG. 4 shows an illustrative process for facilitating connectionless communication.

FIG. 4 shows an illustrative process 400 for facilitate connectionless communication. Process 400 may be described with reference to FIGS. 1, 2, 3 and 4.

Process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Also, one or more of the described blocks may be omitted without departing from the scope of the present disclosure.

At 402, a device or application sends a message to a server. The message includes a unique ID exclusively associated with the device or application. This message may include other data parameters about the device or application, such as its status, configuration, how to connect to it, connectivity, network messaging, and other optional parameters that may be transmitted therewith.

At 404, the unique ID and parameters associated with the device or application are recorded in the database.

At 406, a query is received from any device or application requesting information from the device/application associated with the initial message in 402.

At 408, the database is searched for the unique ID associated with the device/application which is the subject of the query. And, data about the target device/application is transmitted back to the querying device/application. In some examples, the query may be bidirectional, allowing a self-query operation.

Reference herein to "example," "embodiments" or similar formulations means that a particular feature, structure, operation or characteristic described in connection with the example, is included in at least one implementation in this description. Thus, the appearance of such phrases or formulations herein are not necessarily all referring to the same example. Further, various particular features, structures, operations, or characteristics may be combined in any suitable manner in or more examples.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented at least partially by a processor, the method comprising:

creating a database of unique identifiers (IDs) exclusively associated with a corresponding unique computer device or application, wherein the database provides direct access to a collection of computer device information collected via pre-processed formatted messages, which are accessible without prior knowledge of a computer devices' information, for subsequent processing; and sending a formatted message, for storage and use by other processors, computer devices, or applications, each time a device or application communicates with the database, the message from the computer device including a unique ID associated with the computer device or application, and data parameters indicating a status, reachability and connectivity of the computer device or application, wherein communication between computing devices or between computing devices and the database is performed by the computing device independent of proximity of the devices and in a distributed manner of stateless information-exchange requiring no foreknowledge or assumption of processing state of a computer device's parameters; and permitting a plurality of computer devices, applications or unrelated processors to access the stored message and for future retrieval based on the unique ID.

2. The method of claim 1, further comprising:

querying the database about a subject device;

locating a unique identifier corresponding to the subject device, and parameters providing a dynamic report of the status of the subject device at a first-time interval;

transmitting the parameters providing a dynamic report of the status of the subject device at a first-time interval to a requesting device; and automatically establishing a communication link between the requesting device and the subject device.

3. A non-transitory computer-readable medium having recorded thereon a program of instructions that causes a computer device to execute the method of claim 1.

4. A non-transitory computer-readable medium having recorded thereon a program of instructions that causes a computer device to execute a method for facilitating an automated connection between any two devices across disparate and unsecured networks and wherein the connection is not dependent on proximity of computer devices, the method comprising:

creating a database of unique identifiers (IDs) exclusively associated with a corresponding unique computer device or application, wherein the database provides access to a collection of computer device information via pre-processed formatted messages, which are accessible without prior knowledge, of a computer devices' information for subsequent processing; and sending a formatted message, for storage and use by other processors, computer devices, or applications, each time a device or application communicates with the database, the message from the computer device including a unique ID associated with the computer device or application and data parameters indicating a status, reachability and connectivity of the computer device or application, wherein communication between computing devices or between computing devices and the database is performed by the computing device in a distributed manner of stateless information exchange requiring no fore-knowledge or assumption of the processing state of a computer device's parameters;

permitting a plurality of computer devices, applications or unrelated processors to access the stored message and for future retrieval based on the unique ID for the computing device;

locating, within the database, a unique identifier corresponding to the subject device, and parameters providing a dynamic report of the status of the subject device at a first-time interval, upon receiving a request about a subject device;

transmitting the parameters providing a dynamic report of the status of the subject device at a first-time interval to a requesting device; and automatically establishing a communication link between the requesting device and the subject device.

* * * * *